(12) United States Patent
Kim

(10) Patent No.: US 9,012,068 B2
(45) Date of Patent: Apr. 21, 2015

(54) BATTERY CELL AND BATTERY MODULE USING THE SAME

(75) Inventor: Myung-Chul Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 92 days.

(21) Appl. No.: 13/348,117

(22) Filed: Jan. 11, 2012

(65) Prior Publication Data

US 2013/0052514 A1 Feb. 28, 2013

(30) Foreign Application Priority Data

Aug. 29, 2011 (KR) .................. 10-2011-0086411

(51) Int. Cl.
  *H01M 2/30* (2006.01)
  *H01M 2/10* (2006.01)
  *H01M 2/20* (2006.01)
(52) U.S. Cl.
  CPC ............ *H01M 2/1077* (2013.01); *H01M 2/206* (2013.01)
(58) Field of Classification Search
  USPC ...................... 429/159, 158, 179, 99, 82, 178
  See application file for complete search history.

(56) References Cited

U.S. PATENT DOCUMENTS

| 2005/0174092 A1* | 8/2005 | Dougherty et al. ........... 320/128 |
| 2006/0024568 A1 | 2/2006 | Lee |
| 2007/0026739 A1 | 2/2007 | Kim et al. |
| 2011/0151309 A1 | 6/2011 | Park et al. |

FOREIGN PATENT DOCUMENTS

| JP | 2008-091183 A |   | 4/2008 |
| JP | 2008-91183 A | * | 4/2008 |
| JP | 2011-129509 A |   | 6/2011 |
| KR | 10-0570625 B1 |   | 4/2006 |
| KR | 10-2007-0014654 |   | 2/2007 |
| KR | 10-2009-0008087 A |   | 1/2009 |
| KR | 2011-129509 A |   | 6/2011 |
| WO | WO 2009016491 | * | 2/2009 |

OTHER PUBLICATIONS

Okada et al. English Translation of JP 2008-91183 A published Apr. 17, 2008.*
Korean Office Action Dated Jan. 4, 2013.

* cited by examiner

*Primary Examiner* — Stewart Fraser
*Assistant Examiner* — Olatunji Godo
(74) *Attorney, Agent, or Firm* — Lee & Morse, P.C.

(57) ABSTRACT

A battery module may include a plurality of battery cells aligned in one direction, each of the plurality of battery cells including: a first electrode terminal and a second electrode terminal, a bus bar for electrically connecting the plurality of battery cells, the bus bar being fastened to the first electrode terminal or the second electrode terminal of any one of the plurality of battery cells, and the first electrode terminal or the second electrode terminal of an adjacent one of the plurality of battery cells, and a housing accommodating the plurality of battery cells electrically connected by the bus bar. The first electrode terminal and the second electrode terminal of adjacent battery cells may be spaced differently, for example, a battery cell may have first and second electrode terminals spaced at different distances from a center of a top side of the respective battery cell.

12 Claims, 6 Drawing Sheets

BATTERY CELL AND BATTERY MODULE USING THE SAME

CROSS-REFERENCE TO RELATED APPLICATION

This application claims priority to and the benefit of Korean Patent Application No. 10-2011-0086411, filed on Aug. 29, 2011, in the Korean Intellectual Property Office, the entire content of which is incorporated herein by reference.

BACKGROUND

1. Field

The embodiments relate to a battery cell and a battery module using the same.

2. Description of the Related Art

In general, the battery cell is used as an energy source of mobile devices, an electric car, a hybrid car, electricity and the like, and the shape thereof may be variously changed according to a kind of external device to be applied.

Small mobile devices, such as cellular phones, may be operated with the output and capacity of a single battery cell during a certain time. However, a high-capacity battery module is needed for an electric car, a hybrid car, and the like, which consume an enormous amount of power, especially when driven for a long time and/or with high power. The high-capacity battery module is configured with increased output and capacity by electrically connecting a plurality of battery cells to each other. The battery module may increase output voltage or output current according to the number of integral battery cells.

SUMMARY

One or more embodiments may provide a battery module including a plurality of battery cells aligned in one direction, each of the plurality of battery cells having a first electrode terminal and a second electrode terminal; at least one bus bar for electrically connecting the plurality of battery cells, the bus bar being fastened to the first electrode terminal or the second electrode terminal of any one of the plurality of battery cells, and the first electrode terminal or the second electrode terminal of an adjacent one of the plurality of battery cells; and a housing accommodating the plurality of battery cells electrically connected by the bus bar, wherein the first electrode terminal and the second electrode terminal of each of the plurality of battery cells are spaced different distances from a center of a top side of the respective battery cell from which the first electrode terminal and the second electrode terminal protrude. The bus bar may extend diagonally relative to the one direction in which the plurality of battery cells are aligned.

The housing may include a first end plate and a second end plate disposed at opposing ends of the battery module, and a connecting member connecting the first end plate and the second end plate. The connecting member may include a side bracket at opposing upright sides of the plurality of battery cells for supporting the upright sides of the plurality of battery cells, and a bottom bracket supporting a bottom side of the battery cell.

One or more embodiments may provide a battery module including a plurality of battery cells aligned in one direction, each of the plurality of battery cells having a first electrode terminal and a second electrode terminal; at least one bus bar for electrically connecting the plurality of battery cells, the bus bar being fastened to the first electrode terminal or the second electrode terminal of any one of the plurality of battery cells, and the first electrode terminal or the second electrode terminal of an adjacent one of the plurality of battery cells; and a housing accommodating the plurality of battery cells electrically connected by the bus bar, wherein a distance of the first electrode terminal or the second electrode terminal from a center of a top side of each of the plurality of battery cells may be different from a distance of the first electrode terminal or the second electrode terminal from the center of a top side of an adjacent one of the battery cells. The first electrode terminal and the second electrode terminal of each of the plurality of battery cells may be evenly spaced from the center of the top side of the respective battery cell.

The first electrode terminal and the second electrode terminal of a first group of battery cells of the plurality of battery cells may be spaced a first distance from the center of the top side of the respective battery cell, the first electrode terminal and the second electrode terminal of a second group of battery cells of the plurality of battery cells may be spaced a second distance from the center of the top side of the respective battery cell, each of the battery cells of the second group of battery cells may be adjacent a battery cell of the first group of battery cells, and the first distance and the second distance may not be equal. The bus bar may be fastened diagonally relative to an alignment direction of the plurality of battery cells.

A battery cell according to another embodiment may include an electrode assembly including a first electrode plate, the first electrode plate having a first electrode terminal protruding therefrom, a second electrode plate having a second electrode terminal protruding therefrom, and a separator between the first electrode plate and the second electrode plate; a case having an open top, the case configured to retain the electrode assembly, and a cap assembly covering the open top, wherein the first electrode terminal and the second electrode terminal of each of the plurality of battery cells may be spaced different distances from a center of a top side of the respective battery cell from which the first electrode terminal and the second electrode terminal protrude.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
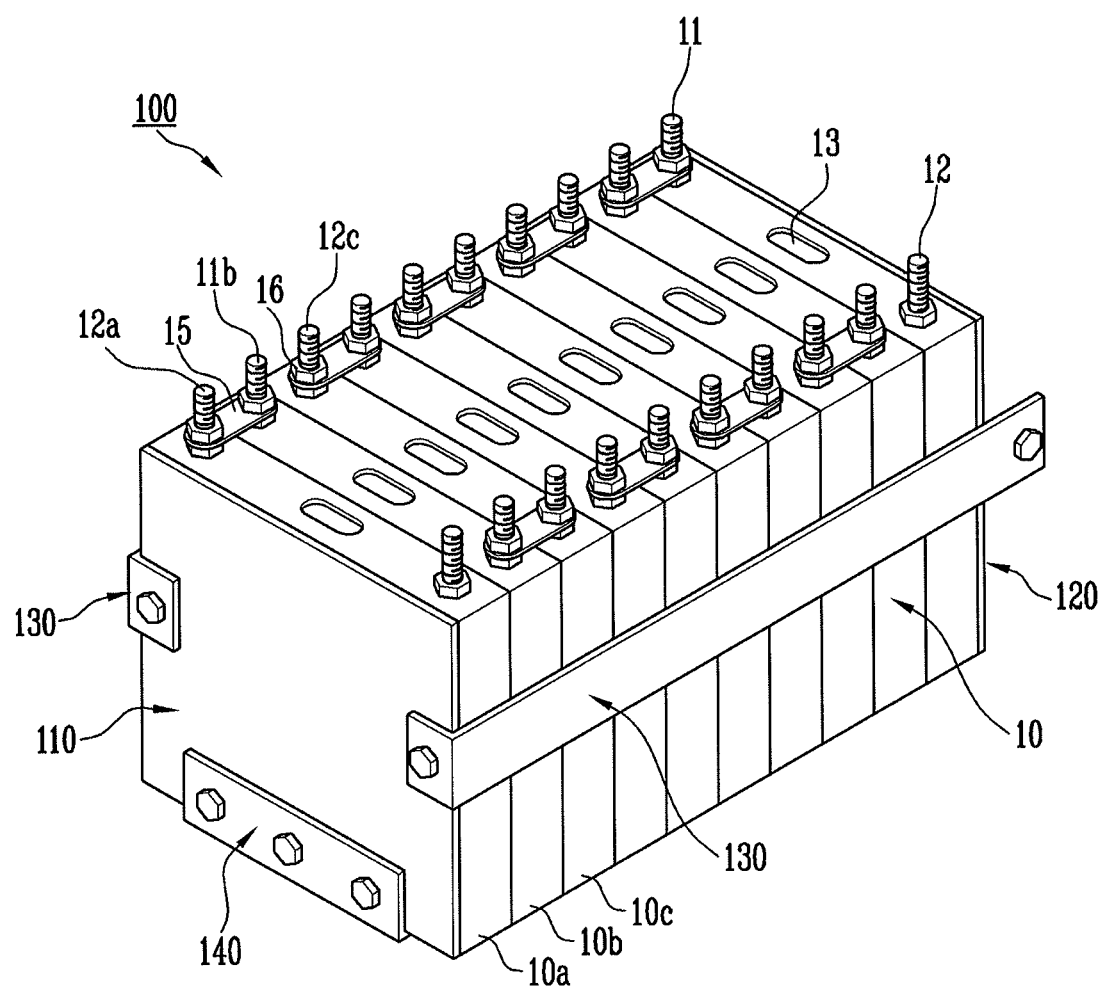
FIG. 1 illustrates a perspective view of a general battery module.

Korean Patent Application No. 10-2011-0086411, filed on Aug. 29, 2011, in the Korean Intellectual Property Office, and entitled: "Battery Cell and Battery Module Using the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when a layer or element is referred to as being "on" another element or substrate, it can be directly on the other element or substrate, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

A description of known function and configurations of the embodiments will be omitted to facilitate an understanding of the embodiments.

FIG. 1 illustrates a perspective view of a general battery module. A description of the general battery module 100 is provided to facilitate a better understanding of the features of battery modules 200, 300, according to embodiments.

As shown in FIG. 1, the general battery module 100 includes a plurality of battery cells 10 aligned in one direction. In the plurality of battery cells 10, bus bars 15 are coupled with anode terminals 11 and cathode terminals 12, which protrude upward through the bus bars 15 and are fastened thereto by tightening nuts 16. The plurality of battery cells 10 are, thereby, electrically connected to each other. The battery module 100 includes a pair of end plates 110, 120 at opposing ends of the battery module, adjacent a pair of outermost battery cells 10. The pair of end plates 110, 120 are fastened to the battery module 100 by connection members. The connection members include a side bracket 130, and a bottom bracket 140. A vent is provided at a top portion of each battery cell 10 for discharging gas generated from the inside of the battery cell 10 to an exterior of the battery cell 10.

The anode terminals 11 and the cathode terminals 12 of the battery module 100 are aligned in a row. Very little distance is provided between the anode terminals 11 and the cathode terminals 12 of adjacent battery cells 10. The distance is further decreased with decreased thickness of the battery cells 10.

When, for example, one of the bus bars 15 is fastened to the cathode terminal 12a of the battery cell 10a and the anode terminal 11b of an adjacent battery cell 10b adjacent, a tool or a part used for the fastening typically contacts the cathode terminal 12c of a battery cell 10c adjacent to the battery cell 10b, and causes a short. While increasing a distance between the battery cells 10, may help to prevent generation of a short during fastening of the bus bar, the battery module 100 would become larger as a result. As described below, the battery module according to embodiments may facilitate prevention of a short during fastening of the bus bar, while maintaining a compact and slim design.

Figure 2:
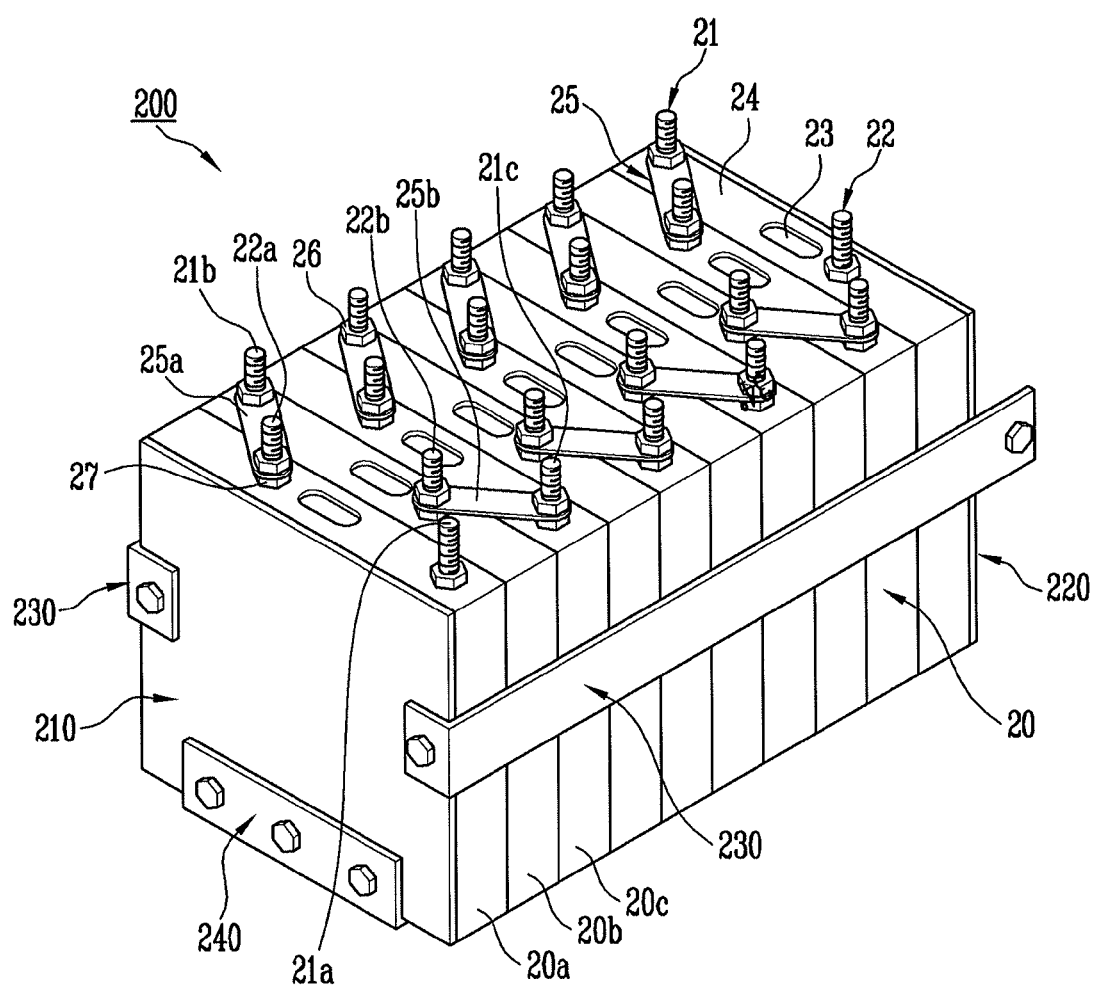
FIG. 2 illustrates a perspective view of the battery module according to an embodiment of the disclosure.
Figure 3:
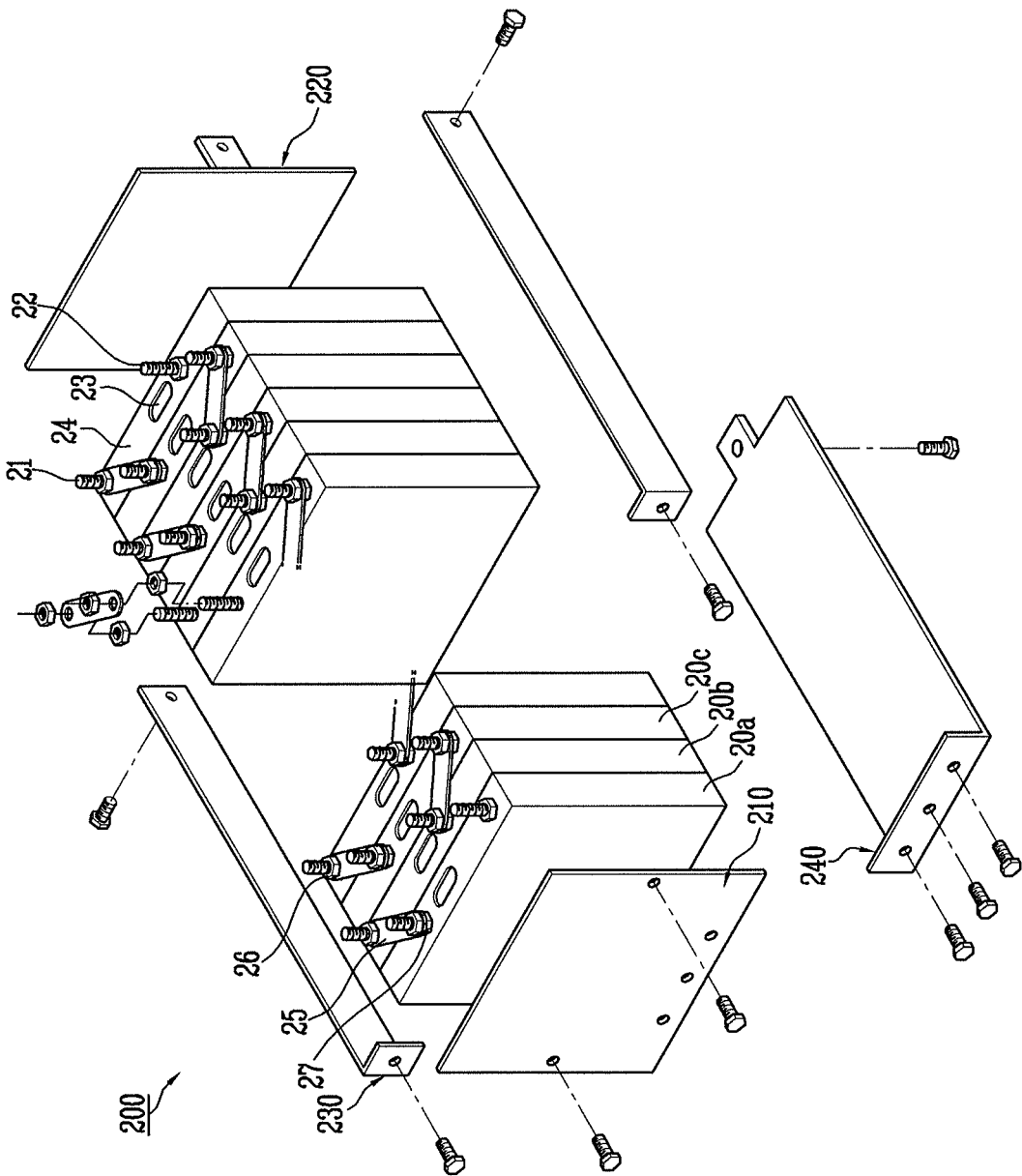
FIG. 3 illustrates an exploded perspective view of the battery module according to an embodiment of the disclosure.

FIG. 2 illustrates a perspective view of the battery module according to an embodiment of the disclosure. FIG. 3 illustrates an exploded perspective view of the battery module of FIG. 2.

As shown in FIG. 2 and FIG. 3, a large capacity battery module 200 according to an embodiment, may include a plurality of battery cells 20, bus bars 25 electrically connecting the plurality of battery cells 20 to each other, and housings 210, 220, 230, and 240, to accommodate the battery cells 20. Various types of battery cells 20 may be used. According to some embodiments, square battery cells 20 may be used.

The plurality of battery cells 20 may be aligned in one direction. A cap assembly 24 may be disposed at a top of each of the battery cells 20. Two terminals (an anode terminal 21 and a cathode terminal 22) may protrude an equal distance from the top of the battery cells 20. The anode terminal 21 and the cathode terminal 22 may include bolts having screw threads formed at their outer peripheries.

The anode terminal 21 and the cathode terminal 22 may be spaced differently with respect to a center of a top side of the respective battery cells from which they protrude. For example, the anode terminals 21 of each of the battery cells 20 may be further from the center of the top side than the cathode terminal 22 of the battery cell 20. As such, an increased distance may be provided between an anode terminal 21 and a cathode terminal 22 of adjacent battery cells. The increased distance between electrode terminals of adjacent battery cells may facilitate fastening of the bus bars to the anode terminals and the cathode terminals without generating a short. Thus, the battery module according to embodiments may prevent generation of a short that may result from contacts between the tool or other part used for fastening the bus bar to the electrode terminals.

In an implementation, the anode terminal 21b of the battery cell 20b, may be crossed, e.g., electrically connected, with the cathode terminal 22a of an adjacent battery cell 20a using the bus bar 25a. The cathode terminal 22b of the battery cell 20b may be crossed with the anode terminal 21c of another adjacent battery cell 20c using bus bar 25b.

Accordingly, in the battery module 200, the battery cells 20 may be assembled such that the anode terminals 21 and the cathode terminals 22 of adjacent battery cells 20 are alternating. The anode terminal 21 and the cathode terminal 22 may be spaced different distances from the center of the top side of the battery cell, at opposing ends of the top side. Thus, the cathode terminal 22 of one of the battery cells 20 may be diagonal to the anode terminal 21 of an adjacent one of the battery cells 20. For example, the cathode terminal 22a of the battery cell 20a may be diagonal to the anode terminal 21b of the adjacent battery cell 20b.

The bus bar 25a may be fastened to the anode terminal 21b of the battery cell 20b and the cathode terminal 22a of the adjacent battery cell 20a, to electrically connect the battery cells 20a, 20b to each other. The cathode terminal 22a may be diagonal to the anode terminal 21b.

The anode terminal 21b and the cathode terminal 22a may each be a type of male screw, which protrudes out of the cap assembly 24. A nut 27 may be fastened and tightened on the cap assembly 24. Further, the anode terminal 21b and the cathode terminal 22a of the adjacent battery cells 20a, 20b may extend through the bus bar 25a and the nut 27. The nut 27 may be fastened and tightened to each of the anode terminal 21b and the cathode terminal 22a, passing through the bus bar 25a, to secure the bus bar 25a to the anode terminal 21b and the cathode terminal 22a.

The adjacent battery cells 20a, 20b may be connected by the bus bar 25a. The battery cell 20b may be connected to the other adjacent battery cell 20c with another bus bar 25b. The cathode terminal 22b of the battery cell 20b and the anode terminal 21c of the battery cell 20c may extend through the bus bar 25b. Further, the nut 26 may be fastened and tightened to each of the anode terminal 21c and the cathode terminal 22b, passing through the bus bar 25a, to secure the bus bar 25b to the anode terminal 21c and the cathode terminal 22b. Each bus bar 25 may be arranged diagonally relative to the alignment of the plurality of battery cells 20.

In the battery module 200, the anode terminal 21 and the cathode terminal 22 of each battery cell 20 may be mutually electrically connected through the bus 25. For example, the cathode terminal 22a of the battery cell 20a may be connected to the anode terminal 21b of the adjacent battery cell 20b by the bus bar 25a. Further, the cathode terminal 22b of the battery cell 20b and the anode terminal 21c of the adjacent battery cell 20c may extend through another bus bar 25b. The plurality of battery cells 20 in the battery module 200 may be electrically connected with the plurality of bus bars 25 in the battery module 200, as described above.

Hereinafter, housings 210, 220, 230, 240 of the battery module 200 will be described in detail.

The housings 210, 220, 230, and 240 may include a pair of end plates 210, 220, disposed adjacent outermost ones of the battery cells 20 in the battery module 200, and a connecting member connecting the pair of end plates 210, 220.

The plurality of battery cells 20 may be aligned in one direction in a space defined between the pair of end plates 210, 220 and between the connecting members connecting the pair of end plates 210, 220. Each of the plurality of battery cells 20 may be aligned side by side, with wide surfaces of adjacent battery cells 20 facing each other. For example, the cathode terminal 22a of the battery cell 20a and the anode terminal 21b of the battery cell 20b adjacent to the battery cell 20a, may be connected by the bus bar 25a. The bus bar 25a may be provided with holes through which the anode terminal 21b and the cathode terminal 22a may extend. The bus bar 25a may connect the electrode terminals 21b, 22a, which may be secured to the bus bar 25a by the nut 26, or other suitable fastening members.

The connection member may include a side bracket 230, supporting opposing vertical or upright sides of the battery cells 20, and a bottom bracket 240, supporting a bottom side of the battery cell 20. Opposing ends of each of the brackets 230, 240 may be fastened to the pair of end plates 210, 220, respectively. The pair of end plates 210, 220, the side brackets 230 and the bottom bracket 240 may be fastened by bolts and nuts, or other suitable fastening members.

The pair of end plates 210, 220 may be arranged to be face-contacted with an outermost battery cell, e.g., to contact a side of an outermost battery cell, and the plurality of battery cells 20 may be between the pair of end plates 210, 220. The plurality of battery cells 20, may be supported by the pair of end plates 210, 220, the side brackets 230 and the bottom bracket 240. The anode terminal 21 and the cathode terminal 22 may be alternately disposed and connected in serial.

The housings 210, 220, 230, 240 may be configured to hold the plurality of battery cells 20 together, and are not limited to the specific structures described herein. The type of connection structure and the number of the battery cells 20 included in the battery module may vary, according to a design of the battery module 200.

The cathode terminal 22 may be closer to a center of a battery cell 20 than the anode terminal 21, in order to increase a distance between the anode terminal 21 and the cathode terminal 22 of adjacent battery cells 20. Thus, when a tool or part used for fastening the bus bar 25 to the anode terminal 21 and the cathode terminal 22 of adjacent battery cells, contacts the anode terminal 21 or the cathode terminal 22, generation of a short may be prevented. The battery cells 20 may have a reduced distance therebetween, without increasing a risk of generating a short. As such, increasing a distance between the battery cells 20 may be unnecessary to avoid or prevent a short, and a slimmer battery module 200 may be achieved.

An increased distance between the anode terminal 21 and the cathode terminal 22 may facilitate discharge of heat that is generated at the bus bar 25 attached thereto, into a lower space of the bus bar 25. Further, each bus bar 25 may be fastened in one direction. For example, the bus bars 25 on one side of the battery module 200 may extend in the same direction. As such, mistakes may be less likely to occur when fastening the bus bar 25 to the anode terminal 21 and the cathode terminal 22, and working efficiency may be improved.

Figure 4A:
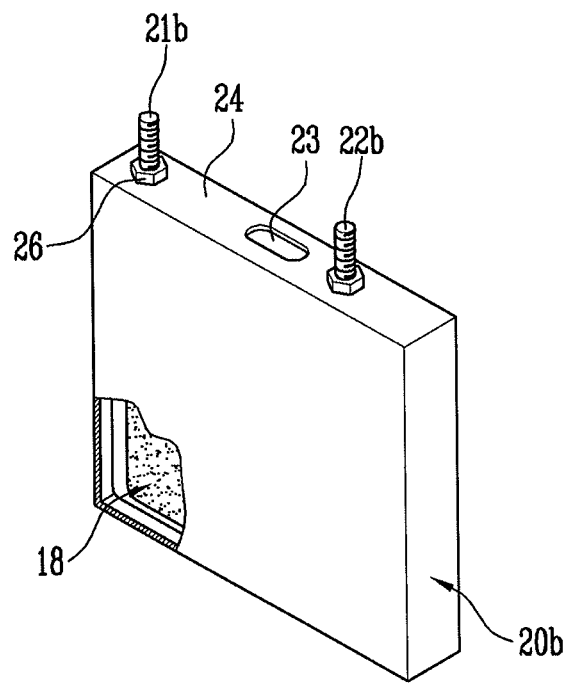
FIG. 4A illustrates a perspective view showing a battery module according to an embodiment of the disclosure.
Figure 4B:
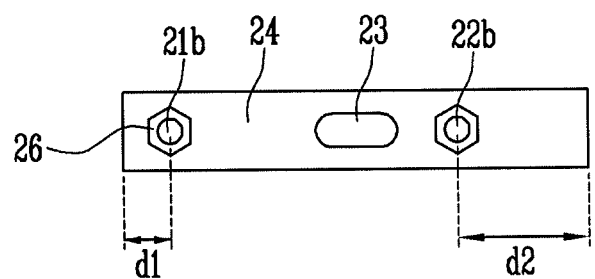
FIG. 4B illustrates a plan view seen from a top of FIG. 4A.

FIG. 4A illustrates a perspective view showing a battery module according to an embodiment of the disclosure. FIG. 4B illustrates a plan view of the battery module shown in FIG. 4A.

In FIGS. 4A and 4B, as described above, the anode terminal 21b and the cathode terminal 22b may be spaced at different distances from the center of the battery 20b. The anode terminal 21b and the cathode terminal 22b may protrude from a top side of the battery cell 20b according to an embodiment of the disclosure. The anode terminal 21b may be spaced at a distance of d1 from one end of the top side of the battery cell 20b and the cathode terminal 22b may be spaced at a distance of d2 from another opposing end of the top side of the battery cell 20b. The distance of d2 may be larger than d1. When aligning the plurality of battery cells 20 (refer to FIG. 2), adjacent electrode terminals of adjacent battery cells 20 may be arranged diagonally to facilitate alignment of the battery cells 20.

Hereinafter, any one of the battery cells 20b will be described in detail.

The battery cell 20b may include a cell case (no reference numeral) having an opening and a cap assembly 24 shielding the opening. The battery cell 20b may accommodate an electrode assembly 18, including an anode plate, a cathode plate, a separator interposed between the anode plate and the cathode plate, and an electrolyte, in the cell case. Further, the top of the cap assembly 24 may be provided with the anode terminal 21b, connected to the anode plate of the electrode assembly 18, and the cathode terminal 22b, connected to the cathode plate of the electrode assembly. The anode terminal 21b and the cathode terminal 22b may protrude from the cap assembly 24. The anode plate and the cathode plate may generate energy by an electrochemical reaction with the electrolyte. The energy may be transferred to the outside through the anode terminal 21 and the cathode terminal 22. Further, a vent 23 may be between the anode terminal 21 and the cathode terminal 22 of the cap assembly 24. The vent 23 may serve as a passage way for discharging gas generated inside of the battery cell 20b to the outside.

Figure 5:
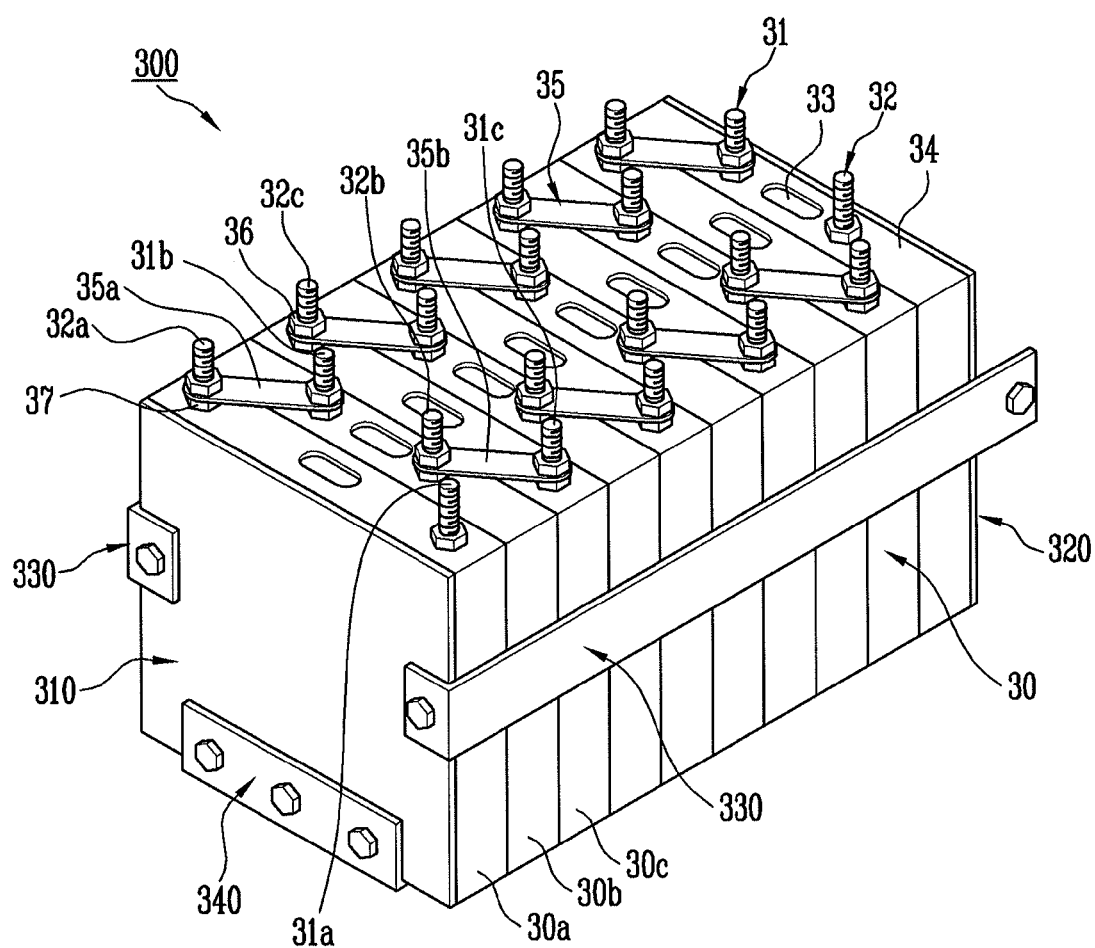
FIG. 5 illustrates a perspective view of the battery module according to another embodiment of the disclosure.
Figure 6A:
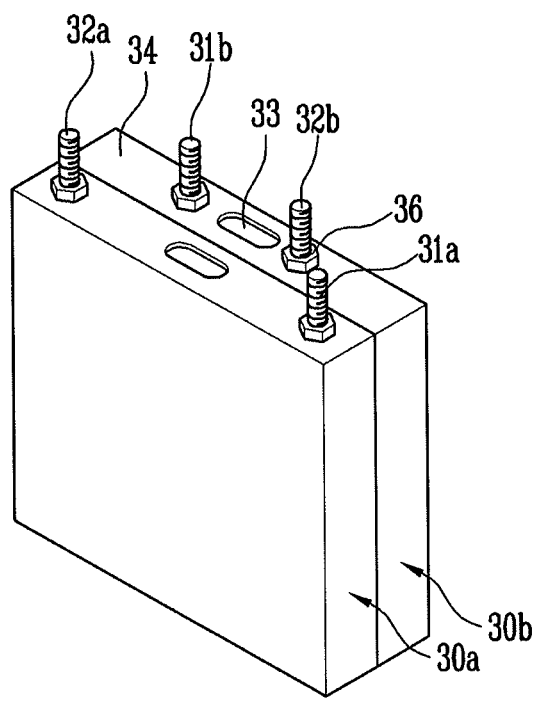
FIG. 6A illustrates a perspective view showing some battery cell according to another embodiment of the disclosure.
Figure 6B:
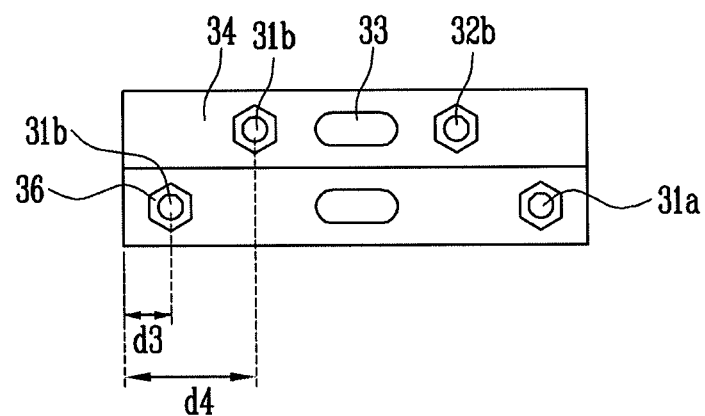
FIG. 6B illustrates a plan view seen from a top of FIG. 6A.

FIG. 5 to FIG. 6B illustrate a battery module according to another embodiment of the disclosure. A description of elements identical to those of the embodiments previously described will be omitted.

FIG. 5 illustrates a perspective view of a battery module according to another embodiment of the disclosure.

In FIG. 5, the battery module 300, according to another embodiment of the disclosure, may include a plurality of battery cells 30, a bus bar 35 electrically connecting the plurality of battery cells 30, and housings 310, 320, 330, 340, accommodating the plurality of battery cells 30, which are electrically connected by the bus bar 35.

The plurality of battery cells 30 may include an anode terminal 31 and a cathode terminal 32, respectively protruding from the top side of the cap assembly 34. The anode terminal 31 and the cathode terminal 32, to which each nut 37 may be fastened and tightened, may be assembled in the cap assembly 34. Further, the anode terminal 31b and the cathode terminal 32a of the adjacent battery cells 30a, 30b may extend through the bus bar 35 and the nut 37. The nut 36 may be fastened and tightened to each of the anode terminal 31b and the cathode terminal 32a, passing through the bus bar 35a, in order to fasten the bus bar 35a to the anode terminal 31b and the cathode terminal 32a.

The anode terminal 31 and the cathode terminal 32 may be spaced evenly from a center of the respective battery cell in which each of the anode terminal 31 and the cathode terminal 32 are formed. The anode terminals 31 and cathode terminals of adjacent battery cells may be positioned differently from one another. In an implementation, a position of an anode terminal 31a and a cathode terminal 32a of a battery cell 30a, with respect to a center of the battery cell 30a, may be different from a position of an anode terminal 31b and a cathode terminal 32b of another adjacent battery cell 30b with respect to a center of the battery cell 30b.

The cathode terminal 32 of each of the plurality of battery cells 30 may be diagonal to the anode terminal 31 of adjacent battery cells 30. For example, the cathode terminal 32a of the battery cell 30a may be diagonal to the anode terminal 31b of the adjacent battery cell 30b. Further, the anode terminal 31a and the cathode terminal 32a of the battery cell 30a may be crossed with the anode terminal 31b and the cathode terminal 32b of the adjacent battery cell 30b.

The cathode terminal 32b of the battery cell 30b and the anode terminal 31c of the yet another battery cell 30c adjacent to the battery cell 30b, may be fastened by the bus bar 35b, and electrically connected to each other. The battery module 300 may be configured to be electrically connected, as described above for the battery module 200.

According to some embodiments, a distance between the anode terminal 31a and an end of the battery cell 30a may be the same as a distance between the cathode terminal 32a and an opposing end of the battery cell 30a. However, relative to these positions of the anode terminal 31a and the cathode terminal 32a, positions of the anode terminal 31b and cathode terminal 32b of the adjacent battery cell may be further from or closer to the opposing ends of the adjacent battery cell 30b. Similarly, a distance between the anode terminal 31a and the cathode terminal 32a of the battery cell 30a from a center of the top side of the battery cell 30a may be less than that of the anode ten final 31b and the cathode terminal 32b of the adjacent battery cell 30b from a center of the battery cell 30b. Further, the anode terminal 31c and the cathode terminal 32c of yet another battery cell 30c adjacent to the battery cell 30b may be in the same position as the anode terminal 31a and the cathode terminal 32a of the battery cell 30a. The plurality of battery cells 30 may be aligned, as described above, such that the electrode terminals of adjacent battery cells 30 are arranged diagonally relative to the alignment direction of the plurality of battery cells. The bus bar 35 may extend diagonally relative to the alignment direction of the plurality of battery cells 30.

FIG. 6A illustrates a perspective view of battery cells according to another embodiment of the disclosure. FIG. 6B illustrates a plan view of the battery cells of FIG. 6A.

As shown in FIGS. 6A and 6B, each of the anode terminals 31a and the cathode terminals 32a of the battery cells 30a may be spaced the same distance from the center of the top side of the cap assembly 34, as described above. Further, each of the anode terminal 31b and the cathode terminal 32b of the adjacent battery cell 30b may also be spaced a same distance from the center of the top side of the cap assembly 34.

However, a distance d3 from the anode terminal 31a and the cathode terminal 32a to a respective end of the battery cell 30a may be different from a distance d4 of the anode terminal 31b and the cathode terminal 32b to a respective end of another adjacent battery cell 30b. For example, the cathode terminal 32a of the battery cell 30a and the anode terminal 31b of another battery cell 30b adjacent to the battery cell 30a may be arranged diagonally relative to the alignment direction of the plurality of battery cells 30. Further, the anode terminal 31a of the battery cell 30a and the cathode terminal 32b of the adjacent battery cell 30b may be arranged diagonally relative to the alignment direction of battery cells 30.

The bus bar 35 may be diagonally fastened to the electrode terminals 31, 32, thereby, preventing generation of a short, which may caused by the tool or the part fastening the bus bar 35.

The position of the electrode terminals of the battery cell, according to embodiments, may prevent generation of a short caused when a tool or a part fastening a bus bar contacts adjacent electrode terminals, in order to improve safety of the battery module.

One or more embodiments may provide a battery cell and a battery module using the same, which may be capable of preventing generation of a short caused when a tool or a part for fastening a bus bar to an electrode terminal contacts an adjacent electrode terminal. The electrode terminals of the battery cells, according to embodiments, may be positioned to improve working efficiency, and also reduce a distance between the battery cells. The adjacent electrode terminals of adjacent battery cells of the battery module according to embodiments, may be diagonally aligned, in order to increase a distance between electrode terminals of adjacent battery cells, without increasing a distance between battery cells. As a result, fastening of the bus bars to the electrode terminals may be facilitated, and an overall slimmer battery module may be achieved.

While embodiments have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells aligned in one direction, each of the plurality of battery cells having a first electrode terminal having a first polarity and a second electrode terminal having a second polarity opposite to that of the first electrode terminal;
   a plurality of bus bars for electrically connecting the plurality of battery cells, each bus bar being fastened to the first electrode terminal or the second electrode terminal of any one of the plurality of battery cells, and the first electrode terminal or the second electrode terminal of an adjacent one of the plurality of battery cells; and a housing accommodating the plurality of battery cells electrically connected by the bus bars, wherein a distance of the first electrode terminal from a center of a top side of each of the plurality of battery cells is different from a distance of the first electrode terminal from the center of a top side of the adjacent one of the battery cells, and wherein each bus bar is fastened diagonally relative to an alignment direction of the plurality of battery cells, the bus bars being oriented in a same direction.

2. The battery module as claimed in claim 1,
wherein the bus bars extend diagonally relative to the one direction in which the plurality of battery cells are aligned.

3. The battery module as claimed in claim 1,
wherein the housing includes a first end plate and a second end plate disposed at opposing ends of the battery module, and a connecting member connecting the first end plate and the second end plate.

4. The battery module as claimed in claim 3, wherein the connecting member includes a side bracket at opposing upright sides of the plurality of battery cells for supporting the upright sides of the plurality of battery cells, and a bottom bracket supporting a bottom side of the battery cell.

5. The battery module as claimed in claim 1,
wherein the first electrode terminal and the second electrode terminal of each of the plurality of battery cells are evenly spaced from the center of the top side of the respective battery cell.

6. The battery module as claimed in claim 1, wherein:
the first electrode terminal and the second electrode terminal of a first group of battery cells of the plurality of battery cells are spaced a first distance from the center of the top side of the respective battery cell, the first electrode terminal and the second electrode terminal of a second group of battery cells of the plurality of battery cells are spaced a second distance from the center of the top side of the respective battery cell, each of the battery cells of the second group of battery cells are adjacent to a battery cell of the first group of battery cells, and the first distance and the second distance are not equal.

7. The battery module as claimed in claim 1, wherein the first electrode terminal of each of the plurality of battery cells is an anode.

8. The battery module as claimed in claim 1, wherein the first electrode terminal of each of the plurality of battery cells is a cathode.

9. The battery module as claimed in claim 8, wherein the second electrode terminal of each of the plurality of battery cells is an anode.

10. The battery module as claimed in claim 8, wherein the second electrode terminal of each of the plurality of battery cells is a cathode.

11. The battery module as claimed in claim 1, wherein the first electrode terminal and the second electrode terminal of each of the plurality of battery cells are disposed on opposing sides of the center of the top side of each of the plurality of battery cells respectively.

12. A battery module, comprising:
a plurality of battery cells aligned in one direction, each of the plurality of battery cells having a first electrode terminal having a first polarity and a second electrode terminal having a second polarity opposite to that of the first electrode terminal;

a plurality of bus bars for electrically connecting the plurality of battery cells, each bus bar being fastened to the first electrode terminal or the second electrode terminal of any one of the plurality of battery cells, and the first electrode terminal or the second electrode terminal of an adjacent one of the plurality of battery cells; and a housing accommodating the plurality of battery cells electrically connected by the bus bars, wherein a distance of the second electrode terminal from a center of a top side of each of the plurality of battery cells is different from a distance of the second electrode terminal from the center of a top side of the adjacent one of the battery cells, and wherein each bus bar is fastened diagonally relative to an alignment direction of the plurality of battery cells, the bus bars being oriented in a same direction.

* * * * *